United States Patent [19]
Knezovich

[11] Patent Number: 5,102,022
[45] Date of Patent: Apr. 7, 1992

[54] LOCKING DEVICE FOR SPARE TIRE CARRIER

[75] Inventor: A. David Knezovich, Rock Springs, Wyo.

[73] Assignee: William D. Knezovich, Lander, Wyo.; a part interest

[21] Appl. No.: 676,763

[22] Filed: Mar. 27, 1991

[51] Int. Cl.⁵ ............................... B62D 43/00
[52] U.S. Cl. ........................ 224/42.25; 224/42.24; 70/259
[58] Field of Search .................. 224/42.24, 42.25; 70/259, 260, 225

[56] References Cited

U.S. PATENT DOCUMENTS

| | | | |
|---|---|---|---|
| 3,715,066 | 2/1973 | Owen | 224/42.24 |
| 3,822,814 | 7/1974 | Baldi | 224/42.06 |
| 3,843,033 | 10/1974 | Wirth, Sr. | 224/42.24 |
| 3,884,057 | 5/1975 | Maurer | 70/259 |
| 4,007,863 | 2/1977 | Norris | 224/42.24 |
| 4,013,203 | 3/1977 | McCauley | 224/42.24 |
| 4,089,449 | 5/1978 | Bayne | 224/42.24 |
| 4,225,066 | 9/1980 | Barr | 224/42.24 |
| 4,416,402 | 11/1983 | Matthew | 224/42.24 |
| 4,598,848 | 7/1986 | Clark | 224/42.24 |
| 4,751,833 | 6/1988 | Stumpf, Jr. | 70/259 |
| 4,883,294 | 11/1989 | Goodspeed | 292/148 |
| 4,932,575 | 6/1990 | Ware | 224/42.42 |

Primary Examiner—Linda J. Sholl
Attorney, Agent, or Firm—John E. Reilly

[57] ABSTRACT

A spare tire carrier is adaptable for use in mounting a tire on a truckbed, van or the like and is made up of a support member having a horizontal mounting tube to support the tire, a locking bar extending through the mounting tube to cooperate with an elongated loding wedge which extends transversely through aligned slots in the tube and through the locking bar, and a padlock extends inwardly from the open end of the mounting tube to lock said locking wedge in position with respect to the mounting tube while being fully protected by the mounting tube from pilfering or theft.

15 Claims, 3 Drawing Sheets

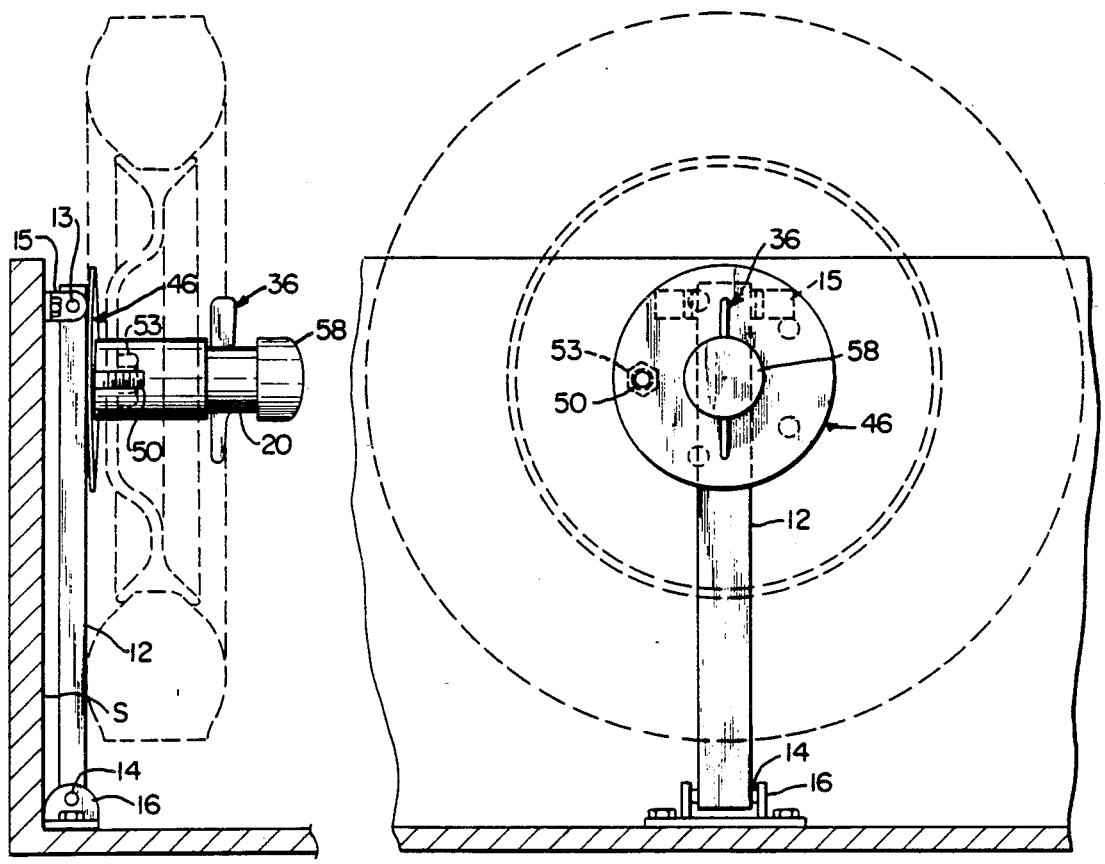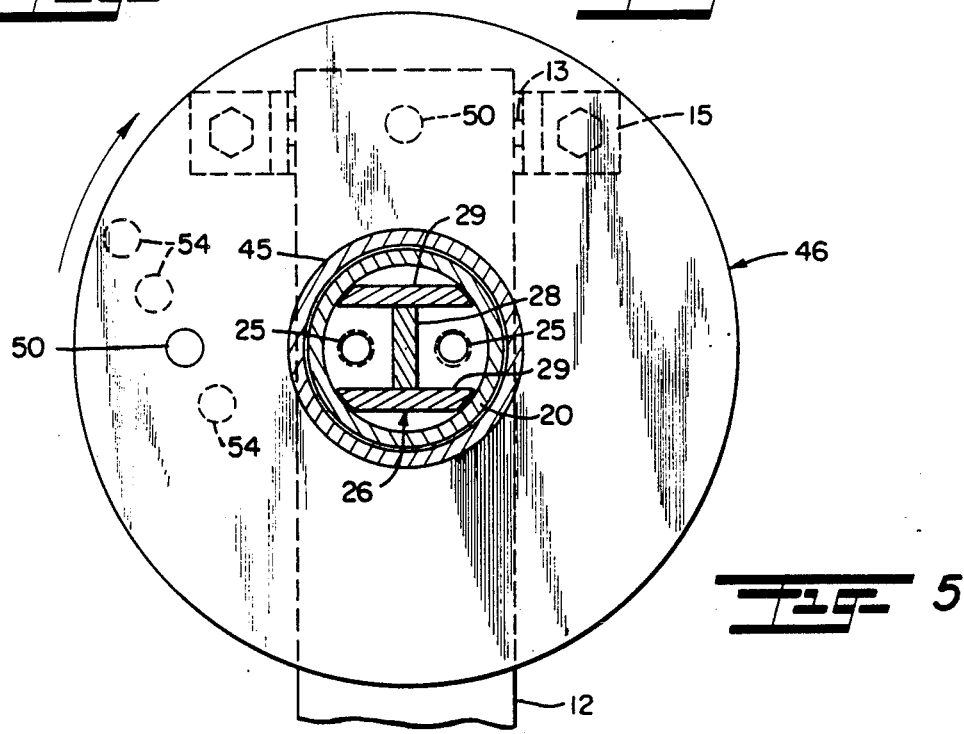

LOCKING DEVICE FOR SPARE TIRE CARRIER

This invention relates to locking devices; and more particularly relates to a novel and improved spare tire carrier for motor vehicles an particularly trucks wherein the carrier is provided with a tamper-proof locking device for securely mounting a tire in wedged engagement with a sidewall of a truckbed or other external body portion of the vehicle.

BACKGROUND AND FIELD OF INVENTION

Numerous approaches have been taken to the design and construction of spare tire carriers and specifically of a type in which the tire can be locked onto the carrier or mount so as to discourage pilfering or theft. Among other problems of prior art carriers is that the locking device is not completely tamper-proof, or is not capable of accommodating a wide range in tire sizes, or will not wedgingly secure the tire against loosening or rattling, or a combination of same.

Of the systems devised in the past, U.S. Pat. No. 4,416,402 to L. M. Matthew is representative of one approach taken in which the tire is mounted on a telescoping tube which extends horizontally away from a sidewall of a pickup bed with a wedge extending through the outer or free end of the tube and is attached by means of a padlock. However, the lock itself is not inserted into the mounting tube so as to be protected against tampering, and inadequate means is provided for wedgingly mounting the tire on the tube so as to be fixed against rattling or loosening when the vehicle is in motion. U.S. Pat. No. 4,225,066 to R. W. Barr proposes mounting of the tire on a threaded rod and securing a lock at the outer or free end of the threaded rod with a shackle guard which passes over the end of the lock in an effort to make it tamper-proof.

In U.S. Pat. No. 3,884,057 to D. L. Maurer the shackle portion is also protected by a surrounding tube or wall but not as a part of a mounting tube that is capable of securely mounting the tire in place while at the same time fully enclosing the padlock. Other patents of interest in this area are U.S. Pat. Nos. 4,932,575 to I. J. Ware, 3,843,033 to R. A. Wirth, Sr., 4,751,833 to C. W. Stumpf, Jr. and 3,715,066 to C. L. Owen.

It is therefore proposed in accordance with the present invention to provide a spare tire carrier for motor vehicles and specifically adaptable for use on the external body portions of a pickup truck or other vehicle in which a mounting tube is capable of accommodating different sizes and depths of tires and to wedgingly secure same in place as well as to serve as a housing for a locking member so as to fully protect the lock against tampering or cutting of the shackle or hasp portion. In this relation, it is important that the mounting device be of rugged but simplified construction requiring a minimum of parts and be readily conformable for use in releasably mounting a spare tire at different locations on a motor vehicle or truck.

SUMMARY OF THE INVENTION

It is therefore an object of the present invention to provide for a novel and improved spare tire carrier device which is conformable for use in securely but releasably attaching different sized tires in position and in such a way as to be able to accommodate tires of varying sizes and depths.

It is another object of the present invention to provide for a novel and improved carrier device for fastening and securing articles on a motor vehicle, such as, a truckbed, van or the like in which a locking device is utilized to prevent unauthorized removal of the article and further in such a way that the locking device is rendered inaccessible from shearing of the shackle portion or otherwise tampering with the lock.

A further object of the present invention is to provide in a spare tire carrier for a mounting tube which is capable of supporting and wedgingly engaging a tire in position on an external part of a motor vehicle wherein the mounting tube also serves as a housing for a locking device to prevent unauthorized removal of the spare tire.

In accordance with the present invention, a spare tire mounting device is provided for mounting a spare tire and wheel rim on a exterior portion of a vehicle and wherein a support member is provided for attachment to the exterior portion and in combination with a mounting tube extending from the support member for insertion through the center opening of the wheel rim, a locking bar extends through the mounting tube and is fixed at one end to the support member, the locking bar being substantially coextensive with the mounting tube and having an open slot at its opposite end facing through the open end of the mounting tube. An elongated locking wedge extends transversely through aligned slots in the tube and through the locking bar, and locking means extends inwardly from the open end of the mounting tube through the open slot and having a shackle portion in surrounding relation to the locking wedge and passing through an opening in the locking bar spaced from the open slot whereby when the shackle portion is locked, the locking wedge is retained against movement through the aligned slots and the locking means is fully protected within the mounting tube against tampering.

Preferably, the locking means is in the form of a padlock with the shackle portion directed inwardly through the open slot of the locking bar and surrounding the locking wedge with the tumbler mechanism of the padlock inserted into a recessed portion of the locking wedge when the shackle portion is locked.

Another important feature resides in a backing sleeve disposed on the mounting tube and having a backing plate of annular S-shaped configuration with a circumferential portion bowed outwardly to impart a wedging action against the wheel rim, and the backing plate can be interchangeably mounted on the mounting tube either in front of or behind the wheel rim.

The above and other objects, advantages and features of the present invention will become more readily appreciated and understood from a consideration of the following detailed description of a preferred embodiment of this invention when taken together with the accompanying drawings, in which:

BRIEF DESCRIPTION OF THE DRAWINGS

FIG. 1 is a front view of the preferred form of spare tire carrier assembled on a truckbed of a motor vehicle;

FIG. 2 is a side view of the preferred form of spare tire carrier shown in FIG. 1 and with the truckbed or frame illustrated in section;

FIG. 5 is a cross-sectional view taken about lines 5—5 of FIG. 3;

DETAILED DESCRIPTION OF THE PREFERRED EMBODIMENT

Figure 3:
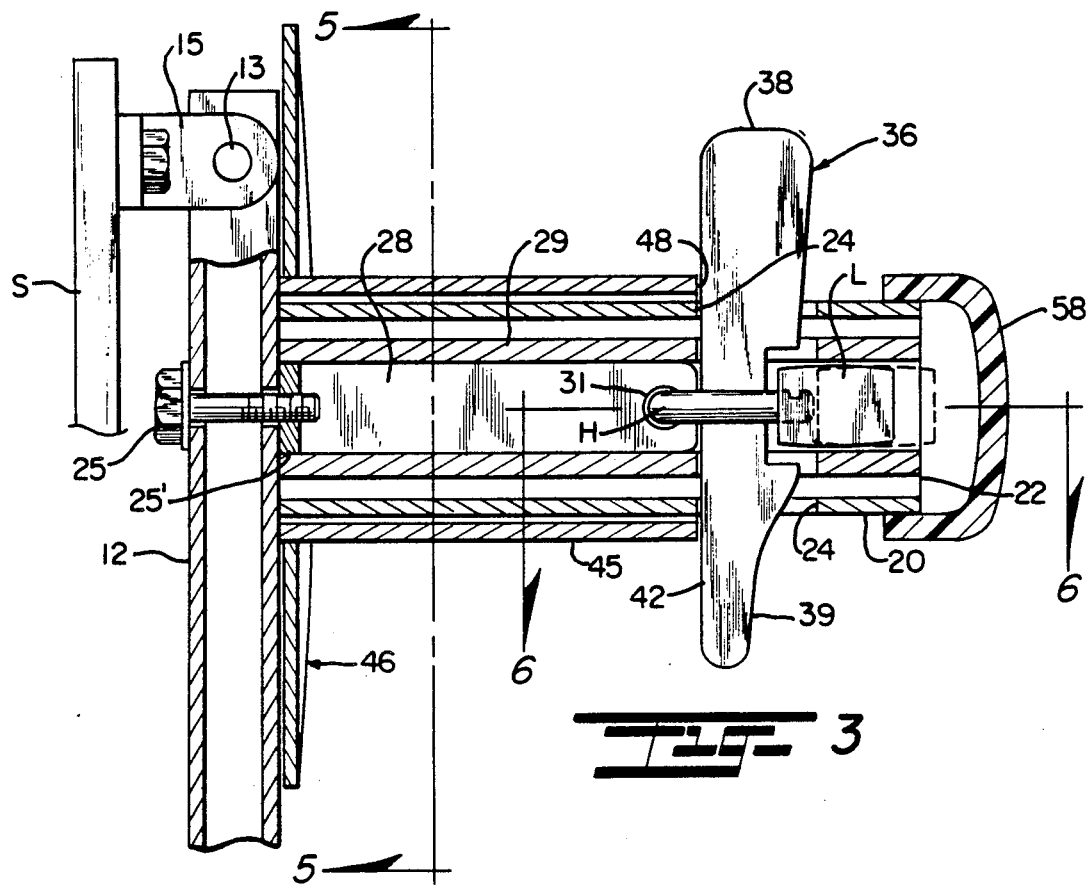
FIG. 3 is a view partially in section of the preferred form of spare tire carrier shown in FIGS. 1 and 2.

Referring in more detail to the drawings, FIGS. 1 and 2 illustrate the mounting of a preferred form of spare tire mount 10 on an interior sidewall S of a truck bed V of a conventional motor vehicle. The mounting device 10 includes a vertical post or frame 12 which is secured by any suitable means, such as, spaced upper and lower pivot pins 13 and 14, respectively, extending transversely through upper and lower ends of the post 12 and inserted in pivot mounts 15 and 16, the upper pivot mount 15 being affixed to the sidewall portion S and the pivot mount 16 being affixed to the horizontal platform of bed V. The pivotal mounting of the post 12 permits the entire mounting assembly to conform to different angles between a sidewall and bed as well as to make it conformable for attachment to other locations if desired.

Figure 4:
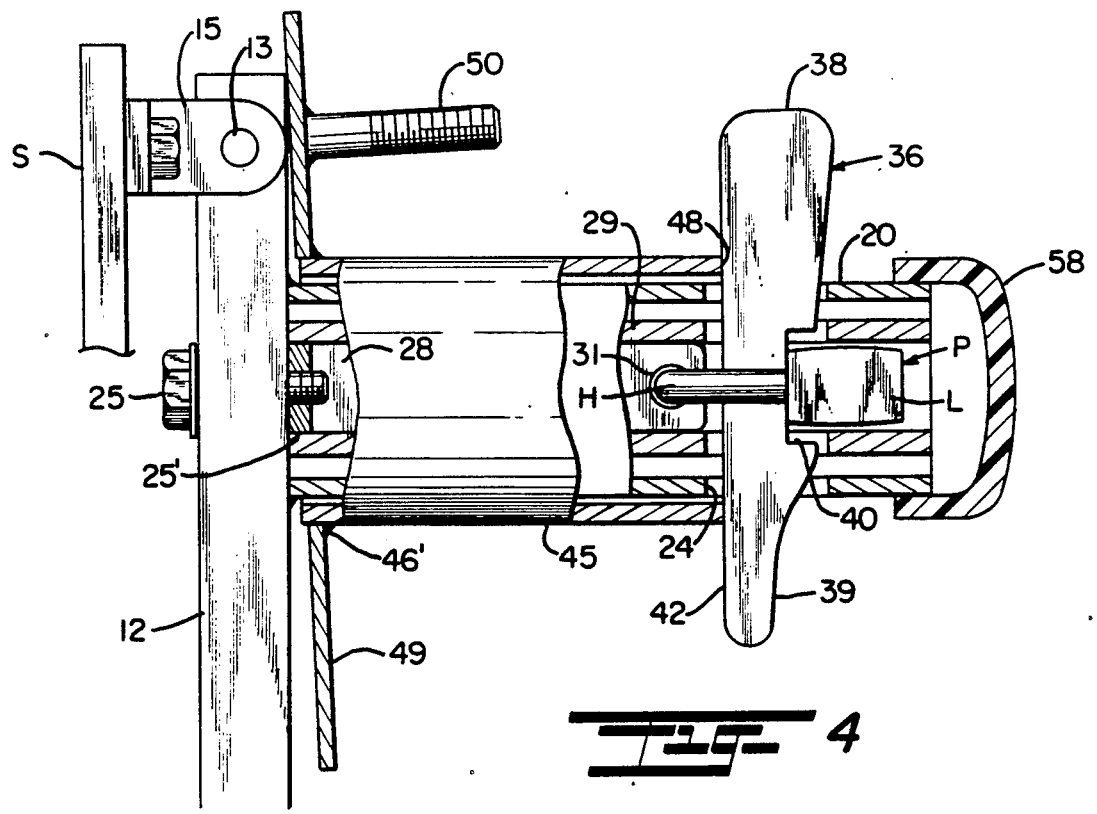
FIG. 4 is another sectional view similar to FIG. 3 but with the backing plate member shifted to accommodate a different depth of tire.
Figure 6:
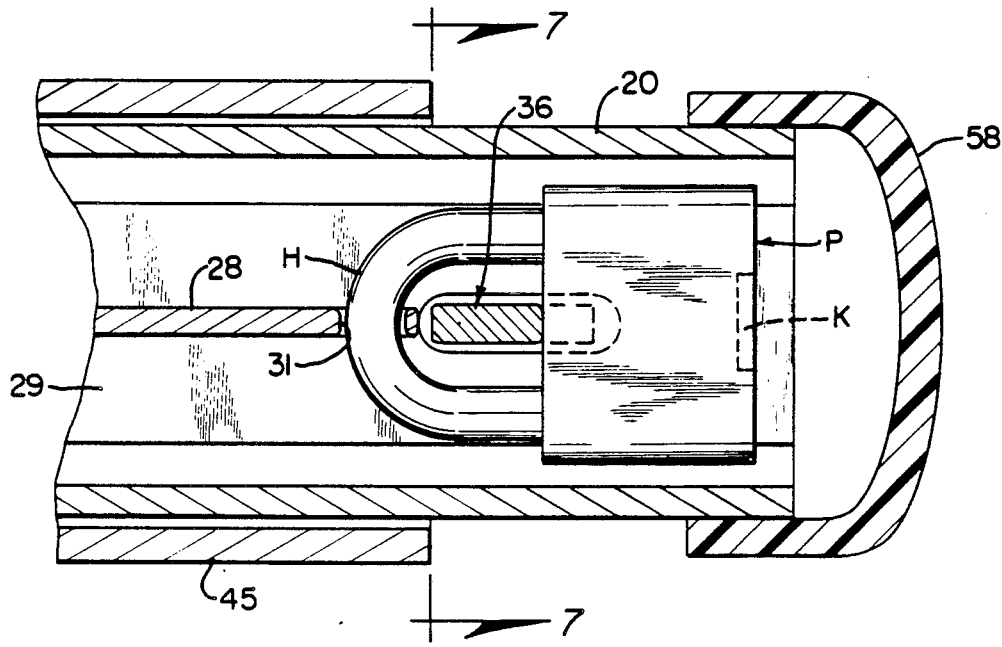
FIG. 6 is another cross-sectional view enlarged taken about lines 6—6 of FIG. 3.
Figure 7:
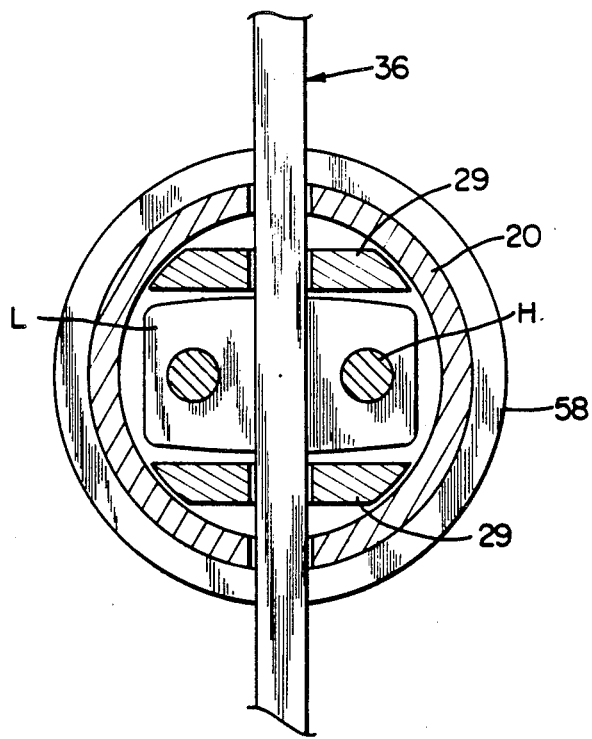
FIG. 7 is a cross-sectional view taken about lines 7—7 of FIG. 6.

The preferred form of mounting tube 20 is welded or otherwise permanently affixed for horizontal extension from the upper end of the post 12. The mounting tube 20 is of uniform diameter throughout and terminates in an open end 22. Diametrically opposed slots 24 are formed in the wall of the tube 20 relatively near the open end 22 and away from the post 12. A locking bar 26 is disposed within the tube 20 and is of a length to be coextensive with the tube. The locking bar 26 has an inner end 27 which is affixed, as shown in FIGS. 3 and 4, to the post 12 by a bolt member 25 which extends through the post and threadedly engages a nut 25' affixed to the inner end of the bar 26. The locking bar 26 is of generally H-shaped cross-section including a cross member or web 28 joining spaced parallel flanges 29, and the web 28 extends only partway along the length of the locking bar 26 to terminate at a point opposite to the inner edges of the aligned slots 24; however, the flanges 29 extend beyond the web 28 to terminate in substantial alignment with the outer end 22 thereby forming an open slotted end 30 in the locking bar to receive a conventional padlock P. The padlock P is illustrated as including a tumbler portion L with a keyslot K at one end facing outwardly through the open end 22 and a shackle portion H which passes through a hole 31 at the outer end of the web 28. Axially extending slots 32 are aligned with the axially extending slots 24 in the mounting tube 20.

A locking wedge 36 extends transversely through the aligned pairs of slots 24 and 32 and through the shackle portion H of the padlock P so that the shackle portion H straddles the locking wedge member 36. The preferred form of wedge 36 is in the form of a flat plate or body which tapers from a wider end 38 into a narrow end 39 and has a straight edge 42 and recessed portion 40 on the opposite tapered edge facing the outer end 22 so that the tumbler portion L of the padlock P will rest against or be seated upon the inner edge of the recessed portion 40 when the padlock P is in a locked position, for example, as shown in FIGS. 3 and 4. In this way, the locking wedge 36 is restrained against release until the padlock P is unlocked so that the tumbler portion can be moved to the dotted line position shown in FIG. 3.

An outer sleeve 45 is dimensioned for extension in outer surrounding relation to the tube 20 and has a backing plate 46 at an inner edge and an outer edge 48 which is positioned at the inner edges, or slightly beyond the inner edges, of the slots 24 in the mounting tube 20. The backing plate 46 is of annular configuration but mounted with one circumferential portion 49 in offset relation to the diametrically opposed circumferential portion, for example, as generally designated at 46' in FIG. 4. In other words, the backing plate 46 is skewed or axially offset so that the circumferential portion 49 is spaced a greater distance away from the post 12 than the remainder of the backing portion. Typically, the circumferential portion 49 may extend but through a limited angle on the order of 45° to 60° around the backing plate and, as seen from FIG. 4, reduces the effective spacing or distance between the plate 46 and the locking wedge 36. In addition, a lug member 50 is positioned on the backing plate 46 for forward or outward extension for insertion into one of a series of lug-receiving openings as designated at 52 in a wheel rim W of a tire T. An outer cap or closure 58, as shown in FIGS. 3 and 4, is press-fit over the open end of the tube 20.

FIG. 5 illustrates a modification of a backing plate in which a series of holes 54 are arranged in a stairstep pattern to accommodate varying size wheel rim diameters. In this modification, the lug, similar to lug 50, is a separate element which is passed through one of the holes 54 and matches or aligns with a lug-receiving opening in the wheel rim W.

In use, the spare tire T is mounted over the assembled mounting tube 20 and sleeve 45 with the wedge member 36 removed and the padlock P in its unlocked position The tire is lined up as described so that one of its lug-receiving openings will receive a lug 50 on the backing plate 49 and a nut 53 or other fastener, as shown in FIG. 1, is threaded onto the lug 50 to retain the tire in position. The locking wedge 36 is then inserted laterally through the aligned slots 24 and 32 and through the center of the shackle portion H until the recessed portion 40 is aligned with the tumbler portion L. The tumbler portion L is then forced inwardly until the shackle portion engages or locks with the tumbler portion resting against the inner surface of the recessed portion 40. If there is undue play between the tire and locking wedge 36, the backing plate 49 is turned so as to line up the offset portion 49 with either end of the wedge 36 thereby reducing the effective distance or spacing for the tire, as described earlier with reference to FIGS. 3 and 4.

It will be appreciated from the foregoing that the spare tire mount of the present invention can be mounted in different locations on the exterior body of a vehicle other than a truckbed as described and is capable of releasably but securely attaching different tires in position. Once locked in position as described, the entire locking member or padlock P is wholly contained within the mounting tube so as not to be accessible to any tampering, such as, by attempts to cut through the shackle portion. Furthermore, the locking bar and particularly the slotted flange portion will discourage any attempt to remove the lock by twisting or grasping the tumbler portion. The locking wedge 36 is so located as to be substantially within the peripheral outline of the tire, as illustrated in FIG. 2, so as not to be exposed to tampering. At the same time, the tire can be easily mounted and removed from the bed of a pickup through the simple expedient of removing the cap and unlocking the padlock P to remove the wedge member 36.

It is therefore to be understood that various modifications and changes may be made in the construction and arrangement of elements comprising the preferred form of invention without departing from the spirit and scope thereof as defined by the appended claims.

I claim:

1. In a spare tire mount a spare tire and wheel rim of a for motor vehicle wherein a support member is adapted for attachment to an exterior body portion of the vehicle, the combination therewith comprising:
   a mounting tube extending from said support member for insertion through the center opening of said wheel rim;
   a locking bar extending through said mounting tube and having an open slot at its opposite end facing outwardly through an open end of said mounting tube;
   an elongated locking wedge extending transversely through aligned slots in diametrically opposed sides of said tube and through said locking bar; and
   locking means extending inwardly from the open end of said mounting tube through said open slot and having a shackle portion in surrounding relation to said locking wedge and passing through an opening in said locking bar spaced from the open slot whereby when said shackle portion is locked, said locking wedge is retained against movement through said aligned slots and said locking means is fully protected within said mounting against tampering.

2. In a spare tire mount according to claim 1, a backing plate disposed on said mounting tube including a lug member extending through a lug-receiving opening in said wheel.

3. In a spare tire mount according to claim 2, said backing plate being of generally annular disk-shaped configuration and having at least a circumferential portion bowed outwardly to impart a wedging action against said wheel rim when said wheel rim and tire are mounted on said mounting tube behind said locking wedge.

4. In a spare tire mount according to claim 1, said locking wedge including a recess aligned with said open slot in said locking bar to receive an end portion of said locking means.

5. In a spare tire mount according to claim 4, said locking means in the form of a padlock including a tumbler mechanism inserted into said recess in said locking wedge.

6. In a spare tire mount according to claim 1, including a backing plate interchangeably mounted on said mounting tube in front of or behind said wheel rim.

7. In a spare tire mount according to claim 1, including an end cap releasably positioned over said open end of said mounting tube.

8. In a spare tire carrier for mounting a spare tire and wheel rim on a truckbed for motor vehicles wherein a vertical support member is adapted for attachment to a vertical sidewall portion of the truckbed, the combination therewith comprising:
   a horizontal mounting tube extending from said support member for insertion through the center opening of said wheel rim;
   a locking bar extending through said mounting tube and fixed at one end to said support member, said bar substantially coextensive with said mounting tube and having an open elongated slot at its opposite end facing outwardly through an open end of said mounting tube;
   an elongated locking wedge extending transversely through aligned slots in diametrically opposed sides of said tube and through aligned slots of said locking bar; and
   a padlock extending inwardly from the open end of said mounting tube through said open slot including means for engaging said wedge when said padlock is locked whereby said wedge is retained against movement through said aligned slots.

9. In a spare tire carrier according to claim 8, a sleeve disposed on said mounting tube including a backing plate and lug member extending through a lug-receiving opening in said wheel rim, said backing plate interchangeably mounted on said mounting tube in front of or behind said wheel rim.

10. In a spare tire carrier according to claim 9, said backing plate being of generally annular disk-shaped configuration and having at least a circumferential portion bowed outwardly to impart a wedging action against said wheel rim when said wheel rim and tire are mounted on said mounting tube behind said locking wedge.

11. In a spare tire carrier according to claim 8, said locking wedge including a recessed portion aligned with said open slot in said locking bar to receive said wedge-engaging mans.

12. In a spare tire carrier according to claim 11, padlock including a tumbler mechanism inserted into said open slot in said locking wedge.

13. In a spare carrier according to claim 8, said padlock including a shackle portion in surrounding relation to said locking wedge and passing through an opening in said locking bar spaced from the open slot whereby when said shackle portion is locked against said wedge, said wedge is retained against movement through said aligned slots.

14. In a spare tire carrier according to claim 13, including an end cap releasably positioned over said padlock.

15. In a spare tire carrier according to claim 8, said locking bar being of generally H-shaped cross-sectional configuration including a web, said web terminating opposite to said aligned slots and said flanges extending beyond said web define said elongated slot, and said locking means defined by a shackle portion extending through a hole in said web.

* * * * *